United States Patent
Ando et al.

(10) Patent No.: US 8,651,967 B2
(45) Date of Patent: Feb. 18, 2014

(54) TORQUE TRANSMISSION DEVICE

(71) Applicants: Advics Co., Ltd., Kariya (JP); Denso Corporation, Kariya (JP)

(72) Inventors: Kunihito Ando, Okazaki (JP); Daishi Kato, Nagoya (JP); Yuki Nakamura, Kariya (JP); Takahiro Naganuma, Kariya (JP); Tomoaki Kawabata, Takahama (JP)

(73) Assignees: Advics Co., Ltd., Kariya-Shi, Aichi-Ken (JP); Denso Corporation, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/650,889

(22) Filed: Oct. 12, 2012

(65) Prior Publication Data

US 2013/0095933 A1 Apr. 18, 2013

(30) Foreign Application Priority Data

Oct. 14, 2011 (JP) ................. 2011-226930

(51) Int. Cl.
*F16D 3/48* (2006.01)
(52) U.S. Cl.
USPC .......................... 464/137; 403/292
(58) Field of Classification Search
USPC .............. 464/33, 50, 137, 138, 162, 182; 403/292–298, 300–302, 306
See application file for complete search history.

(56) References Cited

U.S. PATENT DOCUMENTS

| | | | | |
|---|---|---|---|---|
| 2,292,533 A * | 8/1942 | Maltman | | 464/137 |
| 3,473,261 A * | 10/1969 | Sheckells | | 464/182 X |
| 4,609,302 A * | 9/1986 | Kittell | | 464/162 X |
| 4,954,056 A * | 9/1990 | Muta et al. | | 464/137 X |
| 7,670,229 B2 * | 3/2010 | Disser et al. | | 464/162 |

FOREIGN PATENT DOCUMENTS

JP 2004-320842 A 11/2004

* cited by examiner

*Primary Examiner* — Gregory Binda
*Assistant Examiner* — Josh Skroupa
(74) *Attorney, Agent, or Firm* — Buchanan Ingersoll & Rooney PC

(57) ABSTRACT

A torque transmission device connects two rotary shafts having shaft ends opposing each other, such that torque is transmitted through a torque transmission mechanism provided to a shaft end surface of each of the two rotary shafts. A first rotary shaft of the two rotary shafts has a double-supported structure where both end portions of the first rotary shaft are supported by bearings, respectively. A second rotary shaft of the two rotary shafts has a cantilever structure where only one end portion of the second rotary shaft opposite to the torque transmission mechanism is supported by a bearing, and the second rotary shaft is spaced from one bearing of the bearings supporting the first rotary shaft, the one bearing being provided at a side of the torque transmission mechanism.

3 Claims, 4 Drawing Sheets

TORQUE TRANSMISSION DEVICE

CROSS REFERENCE TO RELATED APPLICATIONS

This application is based on and claims priority under 35 U.S.C. §119 to Japanese Patent Application 2011-226930, filed on Oct. 14, 2011, the entire content of which is incorporated herein by reference.

BACKGROUND

1. Field of the Invention

The present invention relates to a torque transmission device in which two shafts (rotary shafts) are coaxially connected to transmit torque.

2. Description of Related Art

JP-A-2004-320842 discloses an electric power steering device in which a shaft center of a worm shaft of a decelerator is matched with a shaft center of a motor shaft of a motor to thus reduce vibration and noise while realizing size-reduction of the device. In this device, individual bearings are respectively provided to both tip ends of each of two rotary shafts, i.e., the motor shaft and the worm shaft, and each of the two rotary shafts is supported by the two bearings, respectively. A relative movement of both rotary shafts in an approaching direction is regulated by abutment between the bearing at a connection end of each rotary shaft and a step surface of each rotary shaft. In this support structure, opposing shaft ends of both rotary shafts are directly spline-connected, and torque is transmitted from the motor shaft to the worm shaft via the spline connecting part.

However, according to the structure disclosed in JP-A-2004-320842, when a shaft deviation and the like occur, stress is caused at the spline connecting part. Also, since the connection ends of both rotary shafts are supported by the individual bearings, the stress is apt to increase. Also, the stress occurring at the abutting part which regulates the relative movement of both rotary shafts in an approaching direction may be also increased due to a relatively short distance between the abutting part and the spline connecting part.

SUMMARY

The present invention has been made to solve the above problems. An object of the present invention is to provide a torque transmission device capable of suppressing stress and the like which are caused when a shaft deviation occurs in two rotary shafts.

According to an illustrative embodiment of the present invention, there is provided a torque transmission device which connects two rotary shafts having shaft ends opposing each other, such that torque is transmitted through a torque transmission mechanism provided to a shaft end surface of each of the two rotary shafts, wherein a first rotary shaft of the two rotary shafts has a double-supported structure where both end portions of the first rotary shaft are supported by bearings, respectively, and wherein a second rotary shaft of the two rotary shafts has a cantilever structure where only one end portion of the second rotary shaft opposite to the torque transmission mechanism is supported by a bearing, and the second rotary shaft is spaced from one bearing of the bearings supporting the first rotary shaft, the one bearing being provided at a side of the torque transmission mechanism.

According to this configuration, the second rotary shaft has the cantilever structure. Thereby, it is possible to suppress the stress which is caused at the torque transmission mechanism and the like when axes of both shafts are deviated, compared to a configuration where the second rotary shaft also has a double-supported structure. Also, the second rotary shaft is spaced from the bearing supporting the first rotary shaft at a side of the torque transmission mechanism. Thus, even when the axes of both shafts are deviated, the stress does not occur between the second rotary shaft and the bearing and the generation or increase of stress at the torque transmission mechanism due to the generation of the stress is not caused, contrary to a configuration where the second rotary shaft is made to abut on the bearing and the axial movement of the other rotary shaft is thus regulated. That is, since it is possible to configure the torque transmission structure capable of suppressing the stress, it is possible to prolong the lifespan of the torque transmission device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
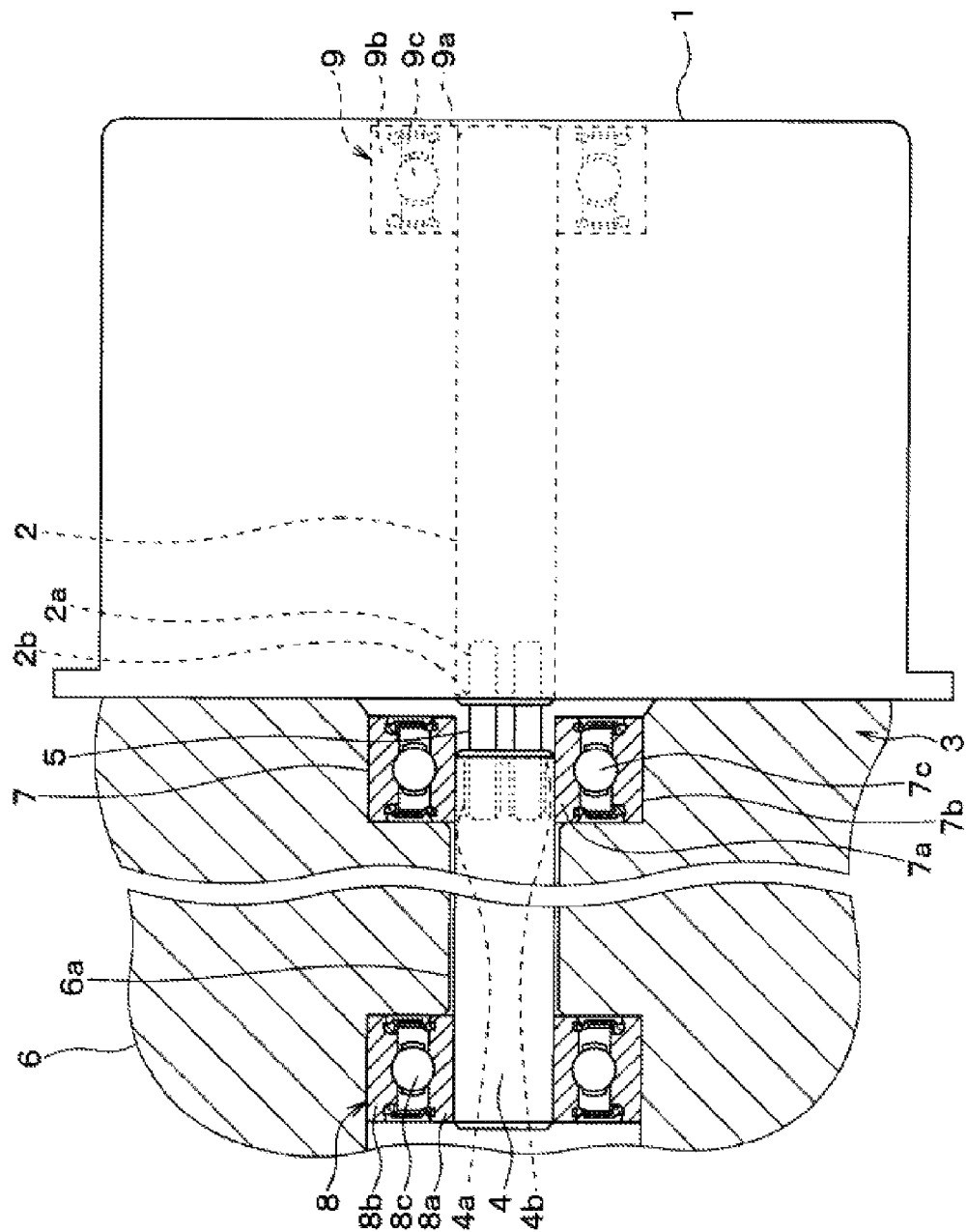
FIG. 1 is a partially enlarged sectional view of a torque transmission device according to a first illustrative embodiment.

Hereinafter, illustrative embodiments of the present invention will be described with reference to the accompanying drawings. Meanwhile, in the respective illustrative embodiments, the same or equivalents parts are indicated with the same reference numerals in the drawings.

First Illustrative Embodiment

FIG. 1 is a partially enlarged sectional view of a torque transmission device according to a first illustrative embodiment of the present invention. In the below, the torque transmission device according to this illustrative embodiment is specifically described with reference to FIG. 1.

The torque transmission device shown in FIG. 1 is configured such that a shaft (rotary shaft) of a motor 1 and a shaft (rotary shaft) 4 of an actuator 3, which is rotation-driven such as pump, are connected and that torque of the motor 1 can be transmitted to the actuator 3 through the connected shafts 2, 4. The shaft 2 of the motor 1 is rotated as power is supplied to the motor 1. Both the shafts 2, 4 are connected to each other through pins 5 at shaft end surfaces of the shaft 2 and the shaft 4 of the actuator 3, which oppose each other.

A housing 6 of the actuator 3 is formed with a hollow part 6a into which the shaft 4 is inserted. An inner diameter of the hollow part 6a is enlarged at a side of the motor 1. The inner diameter-enlarged part, i.e., one end side of the shaft 4 is provided with a bearing 7. Also, the other end side of the shaft 4 in the actuator 3 is also provided with a bearing 8. That is, the shaft 4 has a double-supported structure where both end portions thereof are supported by the two bearings 7, 8. In the meantime, although not shown in FIG. 1, a driving object of the actuator 3 is provided between the bearings 7, 8. As the shaft 2 of the motor 1 is rotated, the shaft 4 is rotated, so that the driving object is driven.

In the meantime, the shaft 2 of the motor 1 is supported by a bearing 9 provided in a case of the motor 1 at an end portion opposite to the shaft 4 of the actuator 3, and the other end portion thereof opposing the shaft 4 is a free end. The end portion of the shaft 2 which opposes the shaft 4 is connected and supported to the shaft 4. That is, the shaft 2 has a cantilever support structure where only one end portion thereof is directly supported by the bearing 9 and the other end portion is supported through the shaft 4, not directly.

The respective bearings 7 to 9 are ball bearings which have inner races 7a to 9a and outer races 7b to 9b, and a plurality of rolling bodies 7c to 9c are interposed between the inner races 7a to 9a and the outer races 7b to 9b. Among them, the shaft 4 is inserted into through-holes of the inner races 7a, 8a of the bearings 7, 8, and the shaft 4 is inserted into a through-hole of the inner race 9a of the bearing 9. The respective end portions of the shafts 2, 4 are supported as they abut on inner wall surfaces (support surfaces) of the through-holes of the respective inner races 7a to 9a.

At the above support state, a tip end of the shaft 2 which opposes the shaft 4 is spaced at a predetermined distance from a tip end of the shaft 4 which opposes the shaft 2 using the pins 5, so that the tip end of the shaft 2 is also spaced from the bearing 7. Therefore, when driving the motor 1, the shaft 2 can be rotated without abutting on the bearing 7.

Figure 2:
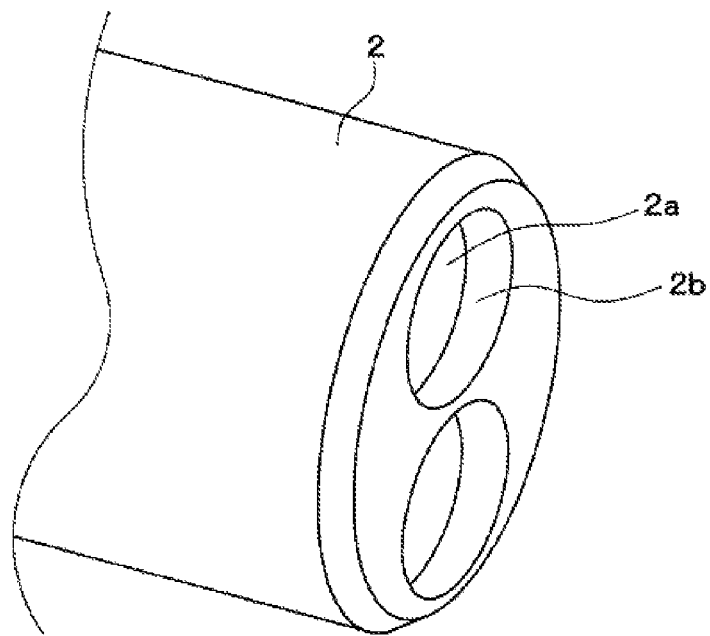
FIG. 2 is an enlarged perspective view of a tip end of a shaft 2 at a side to be connected.
Figure 3:
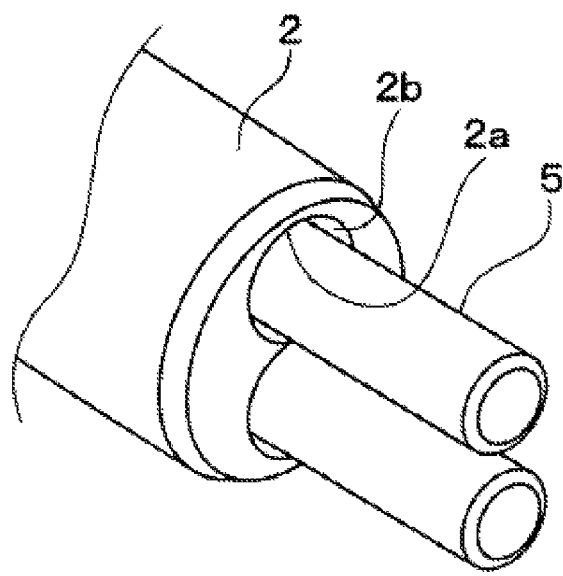
FIG. 3 is an enlarged perspective view showing a state where pins 5 are provided to the shaft 2.

FIG. 2 is an enlarged perspective view of the tip end of the shaft 2 at a side to be connected. FIG. 3 is an enlarged perspective view showing a state where the pins 5 are provided to the shaft 2.

As shown in FIG. 2, a shaft end surface (tip end surface) of the shaft 2 of the motor 1 is formed with two recess portions 2a which are bored from the shaft end surface. The two recess portions 2a are insertion holes having a circular cross section, have the same inner diameter and depth, and are arranged such that they are spaced radially and circumferentially at even intervals with respect to a central axis of the shaft 2. As shown in FIG. 3, the pins 5 are respectively press-fitted into the two recess portions 2a. Thereby, the pins 5 are fixed with protruding from the shaft end surface of the shaft 2, and the protruding parts of the pins 5 configure convex parts.

In the meantime, the two recess portions 2a have taper portions 2b whose inner diameters are gradually increased toward the tip end of the shaft 2. Thus, it is possible to easily insert the pins 5 into the respective recess portions 2a.

Figure 4:
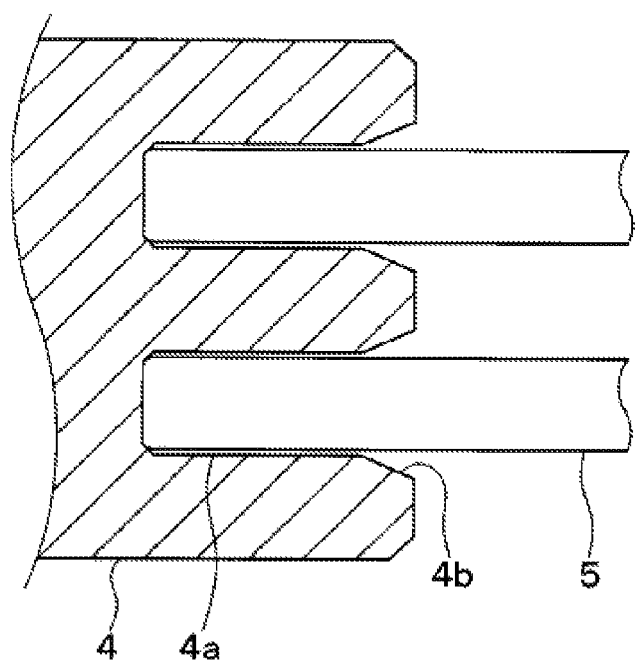
FIG. 4 is an enlarged sectional view of a connection part between a shaft 4 of an actuator 3 and the pins 5.

FIG. 4 is an enlarged sectional view of a connection part between the shaft 4 of the actuator 3 and the pins 5. As shown in FIGS. 2 and 4, basically, a tip end of the shaft 4 of the actuator 3 also has the same configuration as that of the shaft 2 of the motor 1. Specifically, the shaft end surface (tip end surface) of the shaft 4 is formed with two recess portions 4a which are bored from the shaft end surface. The two recess portions 4a are insertion holes having a circular cross section and have a planar bottom surface, respectively. Also, the two recess portions 4a have the same inner diameter and depth, and are arranged such that they are spaced radially and circumferentially at even intervals with respect to a central axis of the shaft 4. Inner diameters of the two recess portions 4a are larger than those of the two recess portions 2a formed on the shaft 2 of the motor 1, so that the pins 5 can be loosely inserted therein. Also, the two recess portions 4a have taper portions 4b whose inner diameters are gradually increased toward the leading end of the shaft 4. Thus, it is possible to easily insert the pins 5 into the respective recess portions 4a.

The pin 5 has a circular cross section corresponding to the recess portions 2a, 4a. In this illustrative embodiment, the pin 5 is a member having a cylindrical shape. An outer diameter of the pin 5 is larger than an inner diameter of an inner side of the taper portion 2b of each of the two recess portions 2a formed on the shaft 2 and is smaller than an inner diameter of an inner side of the taper portion 4b of each of the two recess portions 4a formed on the shaft 4. Thus, as described above, while the pin 5 is press-fitted into the recess portion 2a of the shaft 2 of the motor 1, the pin 5 is loosely inserted into the recess portion 4a of the shaft 4 of the actuator 3. Therefore, when connecting, the pins 5 are first press-fitted into the two recess portions 2a of the shaft 2, the motor 1 and the actuator 3 are arranged such that the tip ends of both shafts 2, 4 oppose each other, and then the pins 5 pres-fitted into the recess portions 2a of the shaft 2 are inserted into the recess portions 4a of the shaft 4. Thereby, both shafts 2, 4 are connected through the pins 5.

Also, the pins 5 have such a length that the tip ends of both shafts 2, 4 are spaced from each other without abutting at the state where the pins 5 are fitted into the recess portions 2a and the recess portions 4a and both shafts 2, 4 are thus connected. That is, since the pins 5 are press-fitted into the respective recess portions 2a of the shaft 2 and are loosely inserted into the respective recess portions 4a of the shaft 4, the pins form convex parts which protrude from the shaft end surface (base end surface) of the shaft 2 after the pins are press-fitted into the two recess portions 2a. So, each of the pins is configured to have such a size that a protruding amount of the convex part, i.e., an axial length thereof is larger than an axial depth of each of the two recess portions 4a of the shaft 4.

Also, both tip ends of the pin 5, i.e., the tip ends of the pin 5 which are inserted into the recess portions 2a, 4a of the shafts 2, 4 are rounded, so that the pins 5 can be easily inserted into the recess portions 2a, 4a of the shafts 2, 4. In this illustrative embodiment, the tip end of the pin 5 is planar and only an outer peripheral edge of the tip end of the pin 5 is rounded. The axial tip end of the pin 5 abuts on the axial inner end of the recess portion 4a of the shaft 4, thereby regulating the relative movement of both shafts 2, 4 in the axially approaching direction and spacing the shaft end surface of the shaft 2 and the shaft end surface of the shaft 4. In this illustrative embodiment, the planar part of the tip end of the pin 5 is configured to abut on the opposing planar bottom surface of the recess portion 4a of the shaft 4. Thus, it is possible to secure a large abutting area, so that the stress occurring at the both abutting parts is reduced.

The pin 5 is made of iron-based material, for example, and is subjected to hardening process so as to increase the rigidity thereof. For example, a roller which is used in a general bearing may be adopted as the pin 5.

In the meantime, it is not particularly limited which of the recess portions 2a, 4a of the shafts 2, 4, the pin 5 is press-fitted and loosely fitted into. However, in this illustrative embodiment, the pin 5 is press-fitted into the recess portion 2a of the shaft 2 and is loosely inserted into the recess portion 4a of the shaft 4. The reason is as follows.

In this illustrative embodiment, the motor 1 just functions as rotating the shaft 4 of the actuator 3 through the shaft 2. Thus, the load which is radially applied to the shaft 2 is small. Compared to this configuration, when a rotary pump (trochoid pump) which is used to control a brake liquid pressure is adopted as the actuator 3, for example, the load, which is caused due to brake fluid of a high pressure which is discharged by pump driving, is applied to the shaft 4. Therefore, the load which is radially applied to the shaft 4 is large. Hence, in order to improve the rigidity, the shaft 4 is often subject to the hardening processing. However, the hardened shaft 4 is difficult to be expanded and contracted, so that it is difficult to press-fit the pin 5 into the recess portion 4a. Accordingly, the pin 5 is press-fitted into the recess portion 2a of the shaft 2 for which it is not required to perform the hardening processing. That is, it is possible to press-fit the pin 5 into the recess portion 2a more easily, compared to the press-fitting into the recess portion 4a of the shaft 4.

As described above, both shafts 2, 4 are connected by the two pins 5, so that the shaft centers of both shafts 2, 4 are precisely matched. Also, it is possible to implement the torque transmission device having the connection structure where the respective pins 5 are arranged radially and circumferentially at even intervals with respect to the central axes of both shafts 2, 4.

With the above-described shaft connecting structure, the shaft 2 of the motor 1 and the shaft 4 of the actuator 3 are connected. That is, since both shafts 2, 4 are connected through the two pins 5 having a circular cross section, it is possible to connect both shafts 2, 4 simply by bringing the shafts to oppose each other. Since the loose-fitting is made at one side, it is possible to easily connect the shafts and to easily match the shaft centers. Also, since it is not necessary to relatively rotate both shafts 2, 4 so as to connect the shafts 2, 4, it is possible to achieve a shaft connecting structure where it is not necessary to supply power to the motor 1 during the manufacturing process, for example.

According to the above-described torque transmission device, while the shaft 4 has the double-supported structure where both end portions thereof are supported by the bearings 7, 8, respectively, the shaft 2 has the cantilever support structure where the tip end thereof opposing the shaft 4 is a free end. The pins 5 which are arranged between the end surfaces of the respective shafts 2, 4 configure the torque transmission mechanism and the bearing 7 at the side of the torque transmission mechanism is spaced from the shaft 2.

That is, one shaft 2 has the cantilever support structure, so that it is possible to suppress the stress which is caused at the torque transmission mechanism and the like when the axes of the shafts 2, 4 are deviated, compared to the double-supported structure. Also, the shaft 2 is spaced from the bearing 7, and therefore, even when the axes of both shafts 2, 4 are deviated, the stress does not occur between the shaft 2 and the bearing 7 and the generation or increase of stress at the torque transmission mechanism due to the generation of the stress is not caused, contrary to a configuration where the shaft 2 is made to abut on the bearing 7 and the axial movement of the shaft 2 is thus regulated. That is, since it is possible to configure the torque transmission structure capable of suppressing the stress, it is possible to prolong the lifespan of the torque transmission device.

Also, since the shaft 2 is configured to have the cantilever structure, the deviation of shaft centers, which occurs in a configuration where the opposing ends of the respective shafts are supported by the individual bearings, does not occur, so that it is possible to match the shaft centers more easily. Also, the one end of the shaft 2 is configured as a free end and is commonly supported by the bearing 7 which supports the shaft 4. Therefore, compared to a configuration where the opposing ends of the respective shafts are supported by the individual bearings, it is possible to reduce the number of bearings and to thus make the device having the shaft connecting mechanism smaller in the axial direction.

The pins 5 are inserted into the recess portions 2a of the shaft 2, so that the convex parts are configured. The convex parts are inserted into the recess portions 4a of the shaft 4 and the axial tip ends of the convex parts configured by the pins 5 abut on the axial inner ends of the recess portions 4a, so that the relative movement of both shafts 2, 4 in the axially approaching direction is regulated, and the shaft end surface of the shaft 2 and the shaft end surface of the shaft 4 are thus spaced. With this simple structure, it is possible to keep the spaced state between the shaft end surface of the shaft 2 and the shaft end surface of the shaft 4. Since the shaft end surfaces of both shafts 2, 4 are spaced from each other, it is possible to reduce the stress which is caused at the convex parts or recess portions 4a when the shafts are deviated, compared to a configuration where the shaft end surfaces abut.

Also, the convex parts of the axial tip end of the shaft 2 are configured by the pins 5 and the pins 5 and shaft 4 are connected through the insertion holes configured by the recess portions 4a formed on the shaft 4. Therefore, compared to a torque transmission structure where the shaft end surfaces are provided with a slit portion and a wedge portion to be fitted into the slit portion, respectively, it is possible to simplify the structure of spacing both shafts 2, 4.

Also, the shaft 2 has the cantilever structure and the axial tip ends of the pins 5 abut on the axial inner ends of the recess portions 4a of the shaft 4, so that the relative movement of both shafts 2, 4 in the axially approaching direction is regulated and the shaft end surface of the shaft 2 and the shaft end surface of the shaft 4 are spaced. With this structure, it is also possible to suppress the load which is caused due to bending moment M of the shaft 2. This is described with reference to FIGS. 5A and 5B.

Figure 5B:
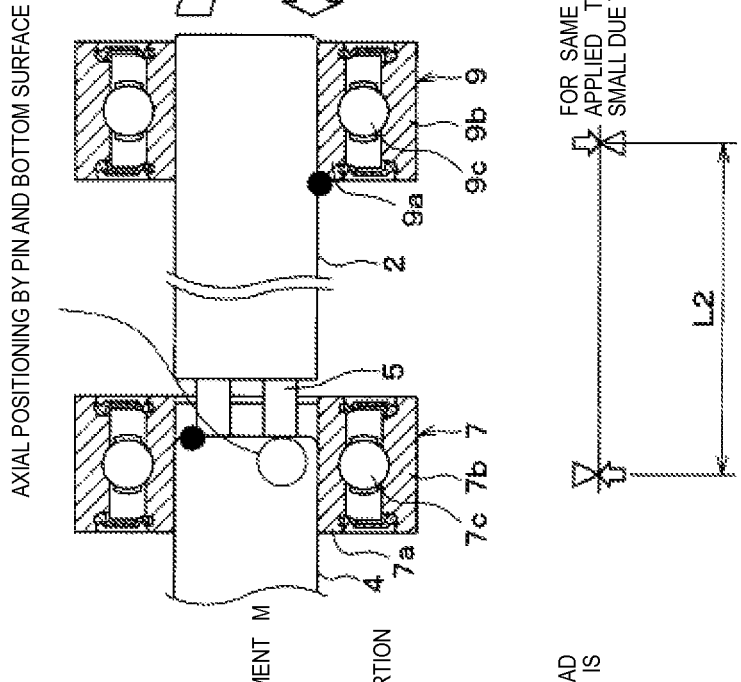
FIG. 5B shows a state where bending moment M is applied to the shaft 2 in a torque transmission structure of the first illustrative embodiment.
Figure 5A:
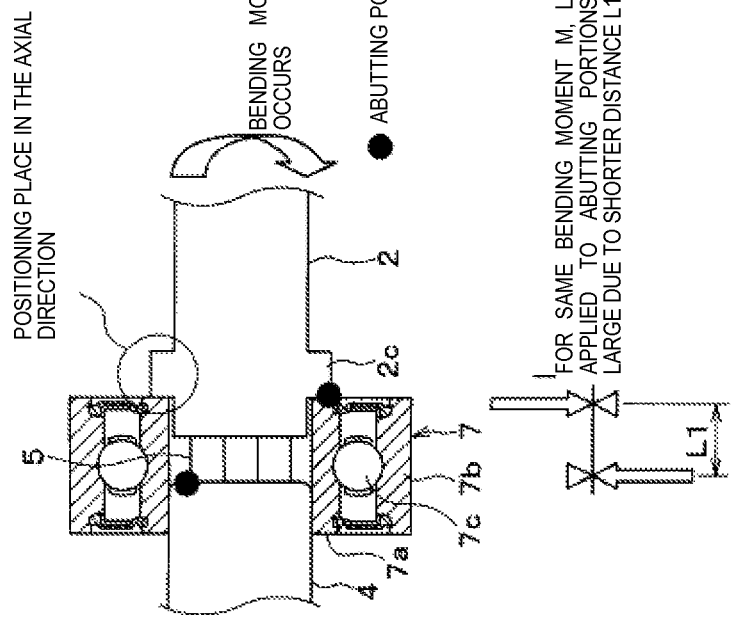
FIG. 5A shows a state where bending moment M is applied to the shaft 2 in a torque transmission structure of a comparative example, which has been examined by the inventors.

FIGS. 5A and 5B show a state where that bending moment M is applied to the shaft 2 in a torque transmission structure of a comparative example, which has been examined by the inventors, and in the torque transmission structure of this illustrative embodiment.

According to the torque transmission structure of the comparative example shown in FIG. 5A, the end portions of both shafts 2, 4 are inserted into the through-hole of the inner race 7a of the bearing 7 and both shafts 2, 4 are directly supported by the bearing 7. An outer periphery of the shaft 2 of the motor 1 is provided with a flange 2c at a position distant from the shaft end surface of the shaft 2 by a predetermined distance. The flange 2c abuts on the bearing 7, so that the shaft 2 is axially positioned. Also with this structure, since the shafts 2, 4 can be commonly supported by one bearing 7, it is possible to make the torque transmission device small.

However, according to the structure shown in FIG. 5A, when the bending moment M is caused for the shaft 2, places shown with black dots in FIG. 5A would become the abutting portions. That is, a portion of the outer periphery of the pin 5, which is positioned at the radially outermost side of the shaft 4, abuts on the inner peripheral surface of the entrance of the recess portion 4a, and the flange 2c abuts on the inner race 7a at an opposite side to the abutting portion with the central lines of the shafts 2, 4 being interposed therebetween. The load shown with arrows in a lower image drawing of FIG. 5A is applied to the respective abutting portions. However, since a distance L1 between both abutting portions is relatively short, the load which is applied would become larger.

Compared to this comparative example, according to the torque transmission structure of this illustrative embodiment shown in FIG. 5B, when the bending moment M is caused for the shaft 2, places shown with black dots in FIG. 5B would become the abutting portions. That is, a portion of the outer periphery of the pin 5, which is positioned at the radially outermost side of the shaft 4, abuts on the inner peripheral surface of the entrance of the recess portion 4a, and the shaft 2 abuts on the inner race 9a of the bearing 9, which supports the end portion of the shaft 2 opposite to the torque transmission mechanism, at an opposite side to the abutting portion with the central lines of the shafts 2, 4 being interposed therebetween. Therefore, even when the load shown with arrows in a lower image drawing of FIG. 5B is applied to the respective abutting portions, since a distance L2 between both abutting portions is relatively long, it is possible to reduce the applied load. Hence, as described above, it is also possible to suppress the load which is caused due to bending moment M of the shaft 2.

Also, in this illustrative embodiment, it is possible to implement the shaft connecting structure by the simple structure of the cylindrical recess portions 2a, 4a and the cylindrical pins 5. Thus, it is possible to easily process the respective parts for configuring the connecting structure and to suppress the manufacturing cost. In particular, since the pin 5 can be configured by the simple structure of the cylindrical shape, it is possible to use a roller of a general bearing having high hardness as the pin 5, so that it is possible to reduce the component cost. Thus, it is possible to further suppress the manufacturing cost.

Other Illustrative Embodiments

In the above illustrative embodiment, the configuration of transmitting the torque of the motor 1 to the actuator 3 has been described as an example of the torque transmission device connecting the two rotary shafts such that the torque can be transmitted through the torque transmission mechanism provided on the shaft end surfaces of the respective rotary shafts. However, the present invention can be applied to torque transmission devices having other configurations.

Also, in the above illustrative embodiment, the structure where the pins 5 press-fitted into the recess portions 2a of the shaft 2 are enabled to serve as the convex parts and the convex parts are inserted into the recess portions 4a of the shaft 4 has been described as an example of the torque transmission structure where the convex parts protrude from one shaft end surface (which functions as the base end surface) of both shafts and the other shaft end surface is bored to form the recess portions. However, this structure is just exemplary. For example, a structure where the convex part is integrated with the rotary shaft can be also employed.

Also, the recess portions 2a, 4a of the shafts 2, 4 are formed as the insertion holes of the pins 5, the pins 5 are press-fitted into the recess portions 2a and are loosely inserted into the recess portions 4a. However, this configuration is just exemplary. For example, after inserting the pin 5 into the recess portion 2a, the pin 5 may be fixed to the shaft 2 by welding and the like. Also, as described above, since the shaft 4 is often subject to the hardening processing so as to improve the rigidity thereof, it is preferable to press-fit the pin 5 into the shaft 2 and then to insert the pin 5 into the recess portion 4a of the shaft 4. However, it may be also possible to press-fit the pin 5 into the shaft 4 and then to insert the pin 5 into the recess portion 2a of the shaft 2.

That is, the connection configuration between the recess portions 2a, 4a of the shafts 2, 4 and the pins 5 is not particularly limited. However, when inserting the pin 5 into both recess portions 2a, 4a, the shaft end surfaces of both shafts 2, 4 should be spaced. Thus, it is required that a sum of insertable depths into the recess portions 2a, 4a should be smaller than the entire length of the pin 5. In the meantime, the insertable depth means a length from the end surface of the recess portions 2a, 4a of the shafts 2, 4 to the bottom surface of the recess portions 2a, 4a when the pin 5 abuts on the bottom surfaces of the recess portions 2a, 4a, and means a press-fittable depth when the pin 5 is press-fitted into the recess portions 2a, 4a.

Also, the shaft 4 of the actuator 3 may be arranged with the tip end thereof (tip end opposing the shaft 2) more protruding toward the motor 1 (the right in FIG. 1) than the bearing 7.

What is claimed is:

1. A torque transmission device which connects two rotary shafts having shaft ends opposing each other, such that torque is transmitted through a torque transmission mechanism provided to a shaft end surface of each of the two rotary shafts,
    wherein a first rotary shaft of the two rotary shafts has a double-supported structure where both end portions of the first rotary shaft are supported by bearings, respectively,
    wherein a second rotary shaft of the two rotary shafts has a cantilever structure where only one end portion of the second rotary shaft opposite to the torque transmission mechanism is supported by a bearing, and the second rotary shaft is spaced from one bearing of the bearings supporting the first rotary shaft, the one bearing being provided at a side of the torque transmission mechanism,
    wherein the torque transmission mechanism includes a convex part provided on a shaft end surface of one rotary shaft of the two rotary shafts and a recess portion provided on a shaft end surface of the other rotary shaft, and the convex part is fitted into the recess portion to thus enable torque transmission between the two rotary shafts,
    wherein an axial tip end of the convex part abuts on an axial inner end of the recess portion in a state where the two rotary shafts are coaxially connected to each other such that a relative movement of the two rotary shafts in an axially approaching direction is regulated, and
    wherein an axial length of the convex part is larger than an axial depth of the recess portion such that the shaft end surface of the one rotary shaft which is a base end surface of the convex part and the convex part is formed thereon and the shaft end surface of the other rotary shaft which is a formation surface of the recess portion and the recess portion is formed thereon are spaced from each other.

2. The torque transmission device according to claim 1, wherein the convex part includes a pin inserted into an insertion hole having a circular cross section which is bored from the base end surface of the one rotary shaft,
    wherein the recess portion is an insertion hole having a circular cross section which is bored from the shaft end surface of the other rotary shaft so as to insert the pin, and
    wherein a sum of insertable depths of the insertion holes which are respectively formed on the two rotary shafts is smaller than an entire length of the pin such that the shaft end surfaces of the two rotary shafts are spaced from each other.

3. The torque transmission device according to claim 1, wherein a bottom surface of the recess portion and a tip end surface of the convex part have planar portions opposing each other, and the planar portions abut on each other such that the relative movement of the two rotary shafts in the axially approaching direction is regulated.

* * * * *